United States Patent
Dettinger et al.

(10) Patent No.: US 7,096,229 B2
(45) Date of Patent: Aug. 22, 2006

(54) DYNAMIC CONTENT GENERATION/REGENERATION FOR A DATABASE SCHEMA ABSTRACTION

(75) Inventors: Richard Dean Dettinger, Rochester, MN (US); Richard Joseph Stevens, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 10/153,977

(22) Filed: May 23, 2002

(65) Prior Publication Data

US 2003/0220893 A1    Nov. 27, 2003

(51) Int. Cl.
  *G06F 17/30* (2006.01)
(52) U.S. Cl. ............... 707/102; 707/100; 707/103; 707/3; 707/10
(58) Field of Classification Search ............ 707/3, 707/2, 4, 100, 102, 10, 103; 715/513, 514
See application file for complete search history.

(56) References Cited

U.S. PATENT DOCUMENTS

| | | | | |
|---|---|---|---|---|
| 5,999,944 A | * | 12/1999 | Lipkin | 707/104.1 |
| 6,343,291 B1 | * | 1/2002 | Goldman | 707/100 |
| 6,678,674 B1 | * | 1/2004 | Saeki | 707/3 |
| 6,725,227 B1 | * | 4/2004 | Li | 707/102 |
| 6,799,184 B1 | * | 9/2004 | Bhatt et al. | 707/102 |
| 2002/0013790 A1 | * | 1/2002 | Vandersluis | 707/514 |
| 2003/0028540 A1 | * | 2/2003 | Lindberg et al. | 707/100 |

OTHER PUBLICATIONS

IBM U.S. Appl. No. 10/083,075, filed on Feb. 26, 2002, "Improved Application Portability and Extensibility Through Database Schema and Query Abstraction" (ROC920020044USI).

IBM U.S. Appl. No. 10/132,228, filed on Apr. 25, 2002, "Dynamic End User Specific Customization of a Application's Physical Data Layer Through a Data Repository Abstraction Layer" (ROC920020088USI).

IBM U.S. Appl. No. 10/131,984, filed on Apr. 25, 2002, "Remote Data Access and Integration of Distributed Data Sources Through Data Schema and Query Abstraction" (ROC920020089USI).

* cited by examiner

*Primary Examiner*—Cam-Y Truong
(74) *Attorney, Agent, or Firm*—Patterson & Sheridan, LLP

(57) ABSTRACT

A method, system and article of manufacture for generating a logical field specification for a logical field associated with a physical entity of data in a computer system, the physical entity of data having a particular physical data representation, the method comprising: providing a logical field specification template comprising a plurality of specification sub-fields, each specification sub-field designated by a sub-field descriptor; accessing the physical entity of data to determine data items associated with the sub-field descriptors; and linking each specification sub-field to a corresponding determined data item.

44 Claims, 10 Drawing Sheets

```
                                                            ← 700
     ┌─────────────────────────────────────────────────────────────┐
     │     Field                                                   │
     │ 702 ── Name = "CreditRatingDescription"                     │
     │ 704 ── Access Method = "Simple-Remote"                      │
     │           URL = "jdbc:driverid://remotesystem.abc.com/creditschema" │
     │           JDBC Driver = "com.xyz.com.driverclass"           │
     │           Table = "credit_t"                                │
     │           Column = "desc"                                   │
     └─────────────────────────────────────────────────────────────┘
```

*Fig. 7*

```
                                                            ← 800
     ┌─────────────────────────────────────────────────────────────┐
     │     Field                                                   │
     │ 802 ── Name = "CreditRating"                                │
     │ 804 ── Access Method = "Procedural"                         │
     │           Service Spec = http://www.mysite.org/services/CreditService.wsdl" │
     │           Service Name = "Credit"                           │
     │           Port Name = "CreditPort"                          │
     │           Operation = "getCreditRating"                     │
     │           Input                                             │
     │               Parm                                          │
     │                   Name = "LastName"                         │
     │                   Value = "LastName"                        │
     │           Output                                            │
     │                   Name = "CreditRating"                     │
     └─────────────────────────────────────────────────────────────┘
```

*Fig. 8*

DYNAMIC CONTENT GENERATION/REGENERATION FOR A DATABASE SCHEMA ABSTRACTION

BACKGROUND OF THE INVENTION

1. Field of the Invention

The present invention generally relates to data processing and more particularly to accessing data independent of the particular manner in which the data is physically represented.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is their close relationship with a given database schema (e.g., a relational database schema). This relationship makes it difficult to support an application as changes are made to the corresponding underlying database schema. Further, the migration of the application to alternative underlying data representations is inhibited. In today's environment, the foregoing disadvantages are largely due to the reliance applications have on SQL, which presumes that a relational model is used to represent information being queried. Furthermore, a given SQL query is dependent upon a particular relational schema since specific database tables, columns and relationships are referenced within the SQL query representation. As a result of these limitations, a number of difficulties arise.

One difficulty is that changes in the underlying relational data model require changes to the SQL foundation that the corresponding application is built upon. Therefore, an application designer must either forgo changing the underlying data model to avoid application maintenance or must change the application to reflect changes in the underlying relational model. Another difficulty is that extending an application to work with multiple relational data models requires separate versions of the application to reflect the unique SQL requirements driven by each unique relational schema. Yet another difficulty is evolution of the application to work with alternate data representations because SQL is designed for use with relational systems. Extending the application to support alternative data representations, such as XML, requires rewriting the application's data management layer to use non-SQL data access methods.

A typical approach used to address the foregoing problems is software encapsulation. Software encapsulation involves using a software interface or component to encapsulate access methods to a particular underlying data representation. An example is found in the Enterprise JavaBean (EJB) specification that is a component of the Java 2 Enterprise Edition (J2EE) suite of technologies. In the case of EJB, entity beans serve to encapsulate a given set of data, exposing a set of Application Program Interfaces (APIs) that can be used to access this information. This is a highly specialized approach requiring the software to be written (in the form of new entity EJBs) whenever a new set of data is to be accessed or when a new pattern of data access is desired. The EJB model also requires a code update, application build and deployment cycle to react to reorganization of the underlying physical data model or to support alternative data representations. EJB programming also requires specialized skills, since more advanced Java programming techniques are involved. Accordingly, the EJB approach and other similar approaches are rather inflexible and costly to maintain for general-purpose query applications accessing an evolving physical data model.

In addition to the difficulties of accessing heterogeneous data representations, today's environment is complicated by the fact that data is often highly distributed. Pervasive infrastructures like the Internet include a host of data sources which must be made accessible to users in order to be of value. Conventional solutions dealing with localized, homogenized data are no longer viable and developing solutions to deal with distributed and heterogeneous data is problematic because such solutions must have knowledge of the location of each data source and must provide unique logic (software) to deal with each different type of data representation. As a result, typical solutions (such as the provision of data warehouses containing all of the information required by applications using the warehouse) do not easily adapt to changes in the location or representation of the data being consumed and cannot easily be redeployed to work with a different data topology. The data warehouse also presents problems when there is a need to expand the content of the warehouse with additional, publicly available information. In some cases, the external data source may be very large and subject to change. It can be very costly to maintain a local copy of such data within a given data warehouse.

Therefore, there is a need for an improved and more flexible method for accessing data which is not limited to the particular manner in which the underlying physical data is represented.

SUMMARY OF THE INVENTION

The present invention generally is directed to a method, system and article of manufacture for accessing data independent of the particular manner in which the data is physically represented. Generally, abstraction layers are provided to represent various distributed data sources available for use by an application and to describe a query used by the application to access and/or update information contained in these data sources. A runtime component is responsible for resolving an abstract query into concrete data access requests to one or more data repositories using information contained in a data repository abstraction component (one of the abstraction layers).

One embodiment provides a method of generating a logical field specification for a logical field associated with a physical entity of data in a computer system, the physical entity of data having a particular physical data representation. The method comprises providing a logical field specification template comprising a plurality of specification sub-fields, each specification sub-field designated by a sub-field descriptor; accessing the physical entity of data to determine data items associated with the sub-field descriptors; and linking each specification sub-field to a corresponding determined data item.

Another embodiment provides a method of providing access to a physical entity of data in a computer system, the physical entity of data having a particular physical data representation. The method comprises providing a logical field specification template comprising a plurality of specification sub-fields, each specification sub-field designated by a sub-field descriptor; accessing the physical entity of data to determine data items associated with the sub-field descriptors; linking each specification sub-field to a corresponding determined data item to generate the logical field; and providing, for a requesting entity, a query specification comprising a plurality of logical fields comprising at least one generated logical field for defining an abstract query.

Another embodiment provides a method of generating a logical field specification for a logical field associated with a physical entity of data in a computer system, the physical entity of data having a particular physical data representation. The method comprises providing a logical field specification comprising a plurality of specification sub-fields, each specification sub-field designated by a sub-field descriptor and at least one specification sub-field representing a dynamic value sub-field designated by a dynamic value sub-field descriptor; accessing the physical entity of data to determine a plurality of data items associated with the dynamic value sub-field descriptor; linking the dynamic value sub-field to the determined plurality of data items.

Still another embodiment provides a data structure in a storage medium representing a logical field specification for a logical field associated with a physical entity of data in a computer system, the physical entity of data having a particular physical data representation, the logical field specification comprising a plurality of specification sub-fields, each specification sub-field designated by a sub-field descriptor; and at least one specification sub-field representing a dynamic value sub-field designated by a dynamic value sub-field descriptor.

Other embodiments provide for computer-readable mediums containing programs which, when executed on a computer system, perform any of the above-described methods.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is field specification of a data repository abstraction component configured with a relational access method; and FIG. 8 is a field specification of a data repository abstraction component configured with a procedural access method.

DETAILED DESCRIPTION OF THE PREFERRED EMBODIMENTS

Introduction

Figure 1:
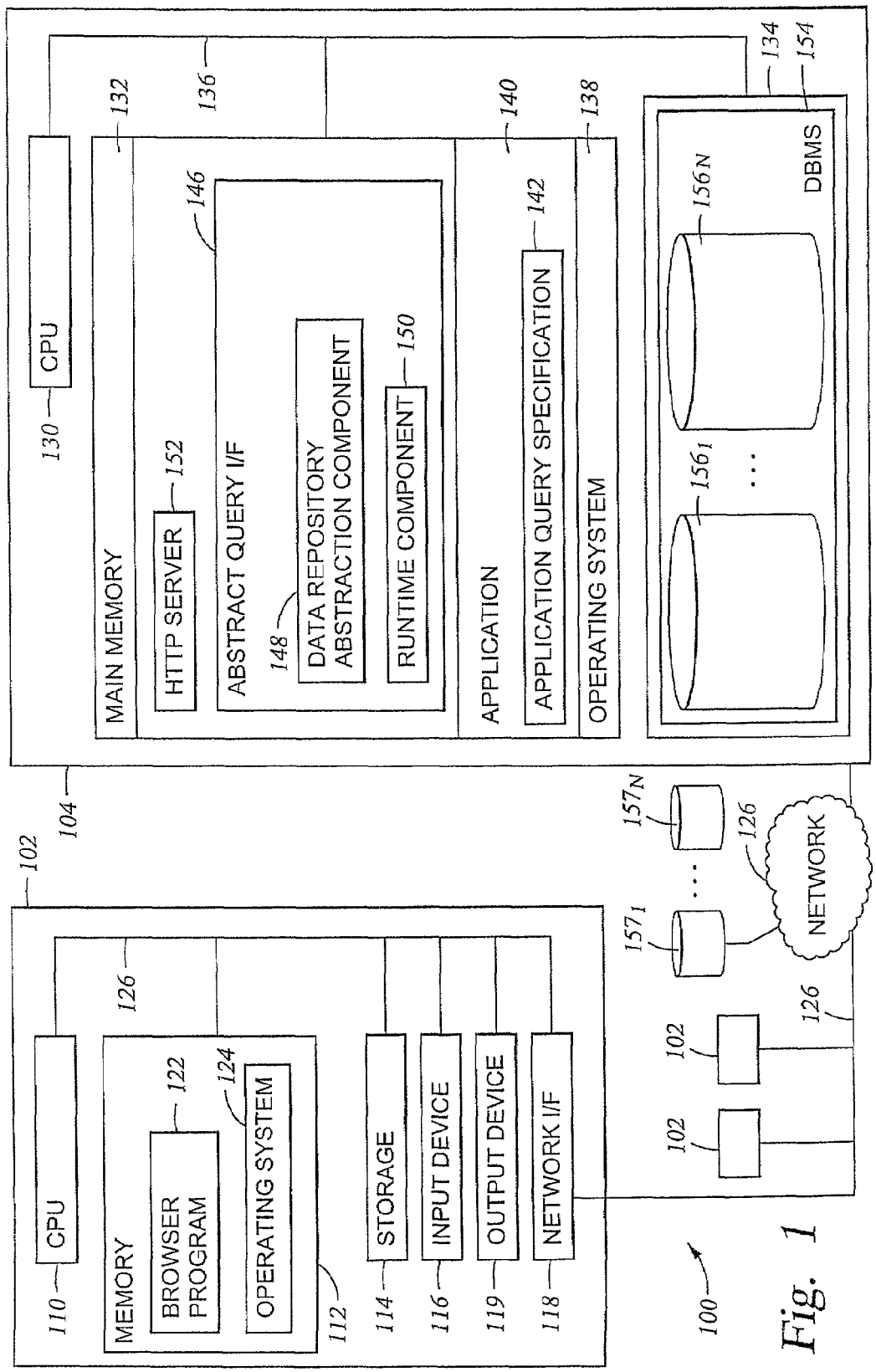
FIG. 1 is a computer system illustratively utilized in accordance with the invention.

The present invention generally is directed to a system, method and article of manufacture for accessing data independent of the particular manner in which the data is physically represented. The data may comprise a plurality of different data sources. In one embodiment, a data repository abstraction layer provides a logical view of one or more underlying data repositories that is independent of the particular manner of data representation. Where multiple data sources are provided, an instance of the data repository abstraction layer is configured with a location specification identifying the location of the data to be accessed. A query abstraction layer is also provided and is based on the data repository abstraction layer. A runtime component performs translation of an abstract query (constructed according to the query abstraction layer) into a form that can be used against a particular physical data representation.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Physical View of Environment

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (one such server 104). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computer 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows®. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

The server computer 104 may be physically arranged in a manner similar to the client computer 102. Accordingly, the server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

The server computer 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used.

The memory 132 further includes one or more applications 140 and an abstract query interface 146. The applications 140 and the abstract query interface 146 are software products comprising a plurality of instructions that are resident at various times in various memory and storage devices in the computer system 100. When read and executed by one or more processors 130 in the server 104, the applications 140 and the abstract query interface 146 cause the computer system 100 to perform the steps necessary to execute steps or elements embodying the various aspects of the invention. The applications 140 (and more generally, any requesting entity, including the operating system 138 and, at the highest level, users) issue queries against a database. Illustrative against which queries may be issued include local databases $156_1 \ldots 156_N$, and remote databases $157_1 \ldots 157_N$, collectively referred to as database(s) 156–157). Illustratively, the databases 156 are shown as part of a database management system (DBMS) 154 in storage 134. More generally, as used herein, the term "databases" refers to any collection of data regardless of the particular physical representation. By way of illustration, the databases 156–157 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

In one embodiment, the queries issued by the applications 140 are defined according to an application query specification 142 included with each application 140. The queries issued by the applications 140 may be predefined (i.e., hard coded as part of the applications 140) or may be generated in response to input (e.g., user input). In either case, the queries (referred to herein as "abstract queries") are composed using logical fields defined by the abstract query interface 146. In particular, the logical fields used in the abstract queries are defined by a data repository abstraction or data repository abstraction component 148 of the abstract query interface 146. The abstract queries are executed by a runtime component 150, which transforms the abstract queries into a form consistent with the physical representation of the data contained in one or more of the databases 156–157. The application query specification 142 and the abstract query interface 146 are further described with reference to FIGS. 2A–B.

In one embodiment, elements of a query are specified by a user through a graphical user interface (GUI). The content of the GUIs is generated by the application(s) 140. In a particular embodiment, the GUI content is hypertext markup language (HTML) content which may be rendered on the client computer systems 102 with the browser program 122. Accordingly, the memory 132 includes a Hypertext Transfer Protocol (http) server process 138 (e.g., a web server) adapted to service requests from the client computer 102. For example, the process 138 may respond to requests to access a database(s) 156, which illustratively resides on the server 104. Incoming client requests for data from a database 156–157 invoke an application 140. When executed by the processor 130, the application 140 causes the server computer 104 to perform the steps or elements embodying the various aspects of the invention, including accessing the database(s) 156–157. In one embodiment, the application 140 comprises a plurality of servlets configured to build GUI elements, which are then rendered by the browser program 122. Where the remote databases 157 are accessed via the application 140, the data repository abstraction component 148 is configured with a location specification identifying the database containing the data to be retrieved. This latter embodiment will be described in more detail below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Logical/Runtime View of Environment

FIGS. 2A–D show a plurality of interrelated components of the invention. The requesting entity (e.g., one of the applications 140 of FIG. 1) issues a query 202 as defined by the respective application query specification 142 of the requesting entity. The resulting query 202 is generally referred to herein as an "abstract query" because the query is composed according to abstract (i.e., logical) fields rather than by direct reference to the underlying physical data entities in the databases 156–157 (shown in FIG. 1). As a result, abstract queries may be defined that are independent of the particular underlying data representation used. The application query specification 142 may include both criteria used for data selection (selection criteria 204) and an explicit specification of the fields to be returned (return data specification 206) based on the selection criteria 204.

The logical fields specified by the application query specification 142 and used to compose the abstract query 202 are defined by the data repository abstraction component 148. In general, the data repository abstraction component 148 exposes information as a set of logical fields that may be used within a query (e.g., the abstract query 202) issued by the application 140 to specify criteria for data selection and specify the form of result data returned from a query operation. The logical fields are defined independently of the underlying data representation being used in the databases 156–157, thereby allowing queries to be formed that are loosely coupled to the underlying data representation.

Figure 2A:
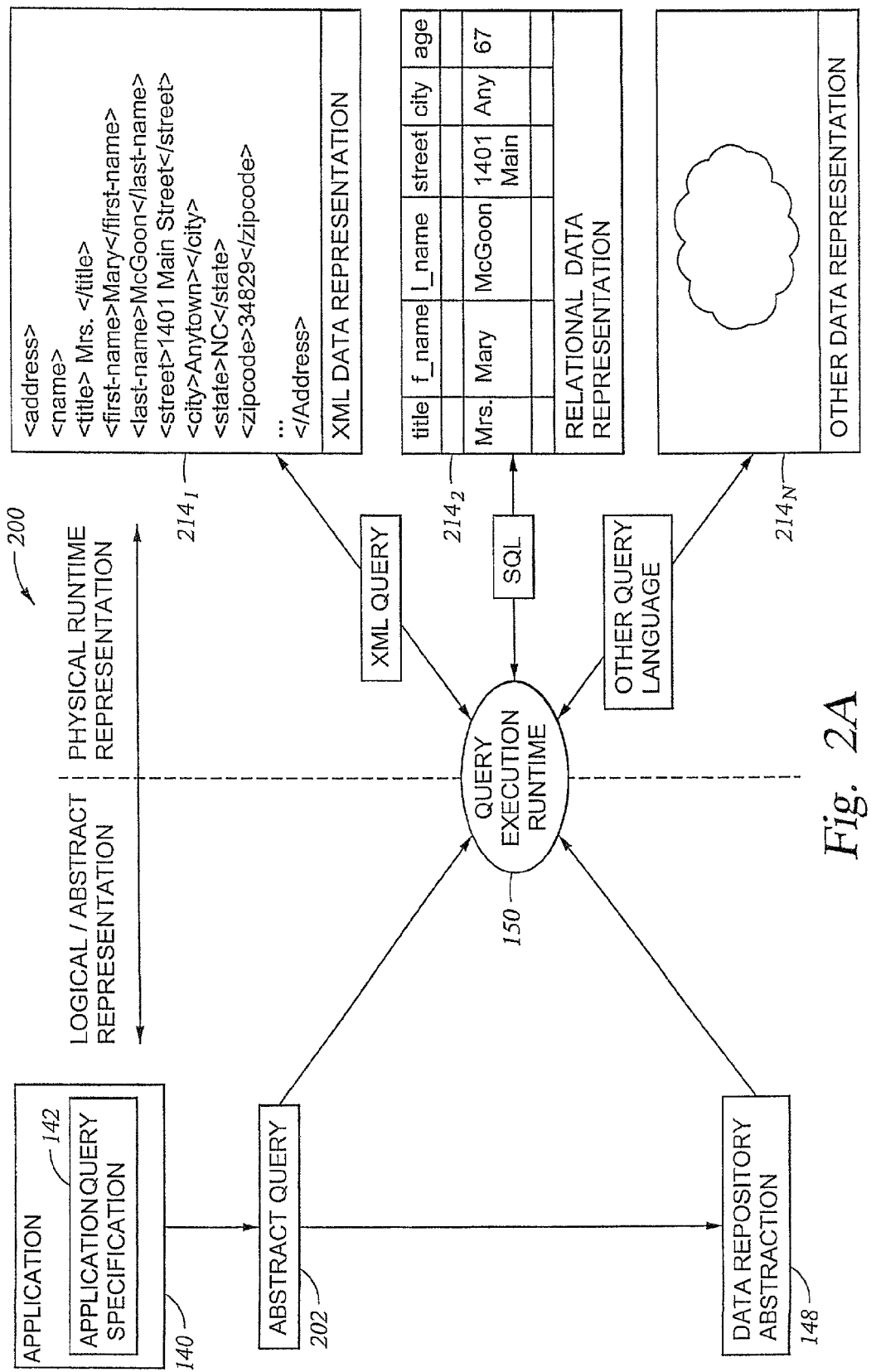
FIG. 2A is an illustrative relational view of software components.

The physical data in the databases 156–157 (FIG. 1) is represented in FIG. 2A as physical data representations $214_1$, $214_2$ ... $214_N$. By way of illustration, two data representations are shown, an XML data representation $214_1$ and a relational data representation $214_2$. The physical data representation $214_N$ indicates that any other data representation, known or unknown, is contemplated. For each separate physical data representation 214, a different single data repository abstraction component 148 may be provided. Alternatively, a single data repository abstraction component 148 may contain field specifications (with associated access methods) for two or more physical data representations 214. Still alternatively, multiple data repository abstraction components 148 may be provided, where each data repository abstraction component 148 exposes different portions of the same underlying physical data (which may comprise one or more physical data representations 214). In this manner, a single application 140 may be used simultaneously by multiple users to access the same underlying data where the particular portions of the underlying data exposed to the application are determined by the respective data repository abstraction component 148, as will now be described with reference to FIG. 2B.

Figure 2B:
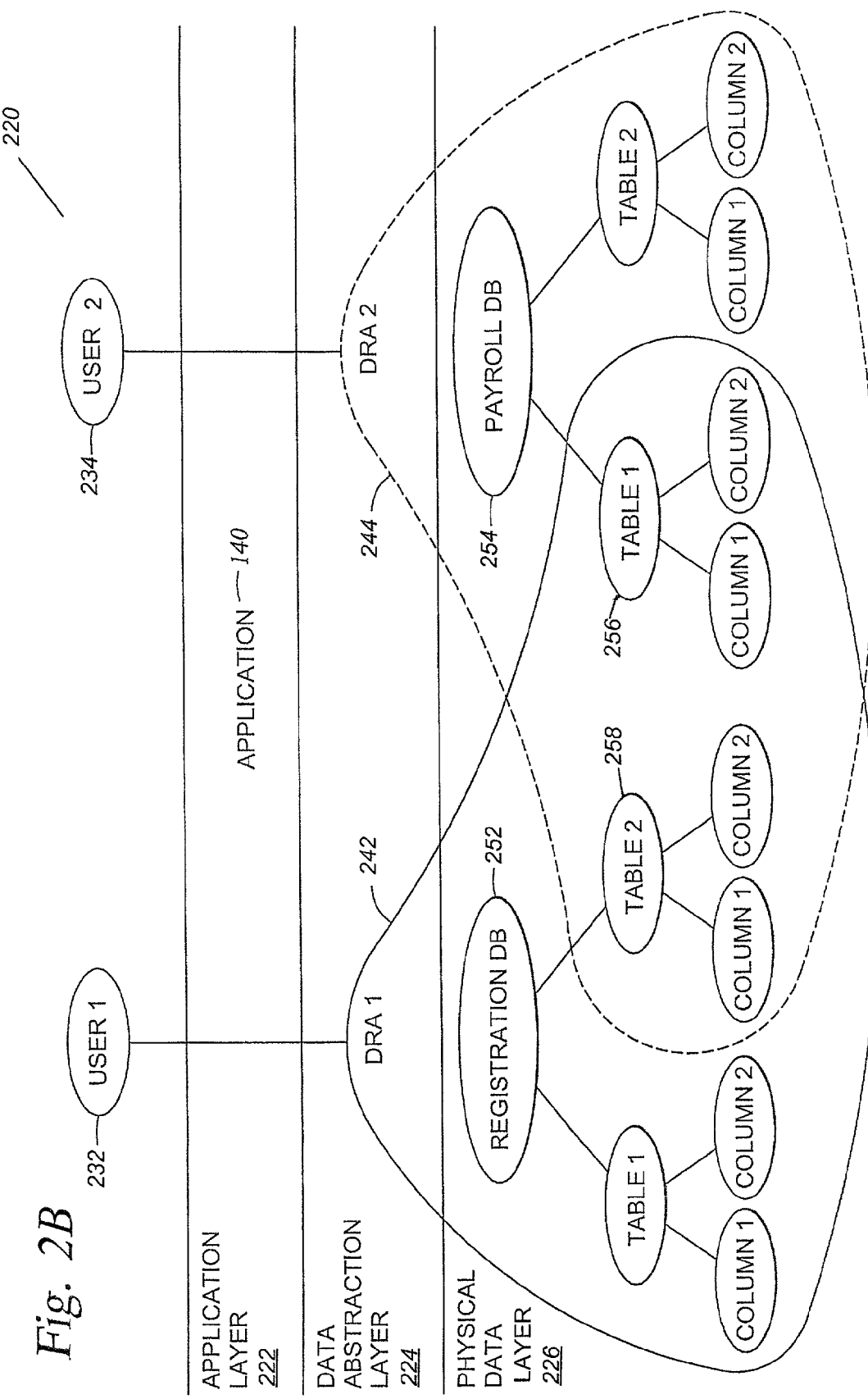
FIG. 2B illustrates different layers involved in accessing data according to the present invention.

FIG. 2B illustrates an embodiment of an environment 220 that represents different layers involved in accessing data independent of the particular manner in which the data is physically represented. In environment 220, multiple instances of a data repository abstraction component, which coexist in a single application space, are shown by way of example.

The environment 220 generally comprises an application layer 222 (defined by the application 140), a data abstraction layer 224, and a physical data layer 226. The environment 220 further shows two exemplary users 232, 234 accessing the physical data layer 226 via the application layer 222 and the data abstraction layer 224. Accordingly, the users 232, 234 are accessing the same physical data layer 226 through a common application layer 222. However, the data being exposed to the respective users 232, 234 is not the same. Rather, each user is exposed to selected portions of the physical data layer 226 according to the definition of the data abstraction layer 224. More particularly, the data abstraction layer 224 illustratively includes two data repository abstractions or data repository abstraction components, DRA1 242 and DRA2 244, which define the data that will be exposed to the users 232, 234, respectively, via the application layer 222. In the present example, the first data repository abstraction (DRA1 242) exposes all of a first database 252 (registration database) and TABLE 1 256 of a second database 254 (payroll database) while the second data repository abstraction (DRA2 244) exposes all of the second database 254 and TABLE 2 258 of the first database 252. It should be noted that the particular data exposed by the respective data repository abstraction components is merely illustrative. More generally, any portion of the databases 252, 254 may be exposed, as well as any other databases of the physical data layer 226. By way of illustration the environment 220 shows two users 232, 234, however, more generally any number of users may be accessing the data of the physical data layer 226.

This latter embodiment is described in more detail in U.S. patent application Ser. No. 10/132,228, filed Apr. 25, 2002, entitled "DYNAMIC END USER SPECIFIC CUSTOMIZATION OF AN APPLICATION'S PHYSICAL DATA LAYER THROUGH A DATA REPOSITORY ABSTRACTION LAYER" and assigned to International Business Machines, Inc., which is hereby incorporated by reference in its entirety.

Figure 2C:
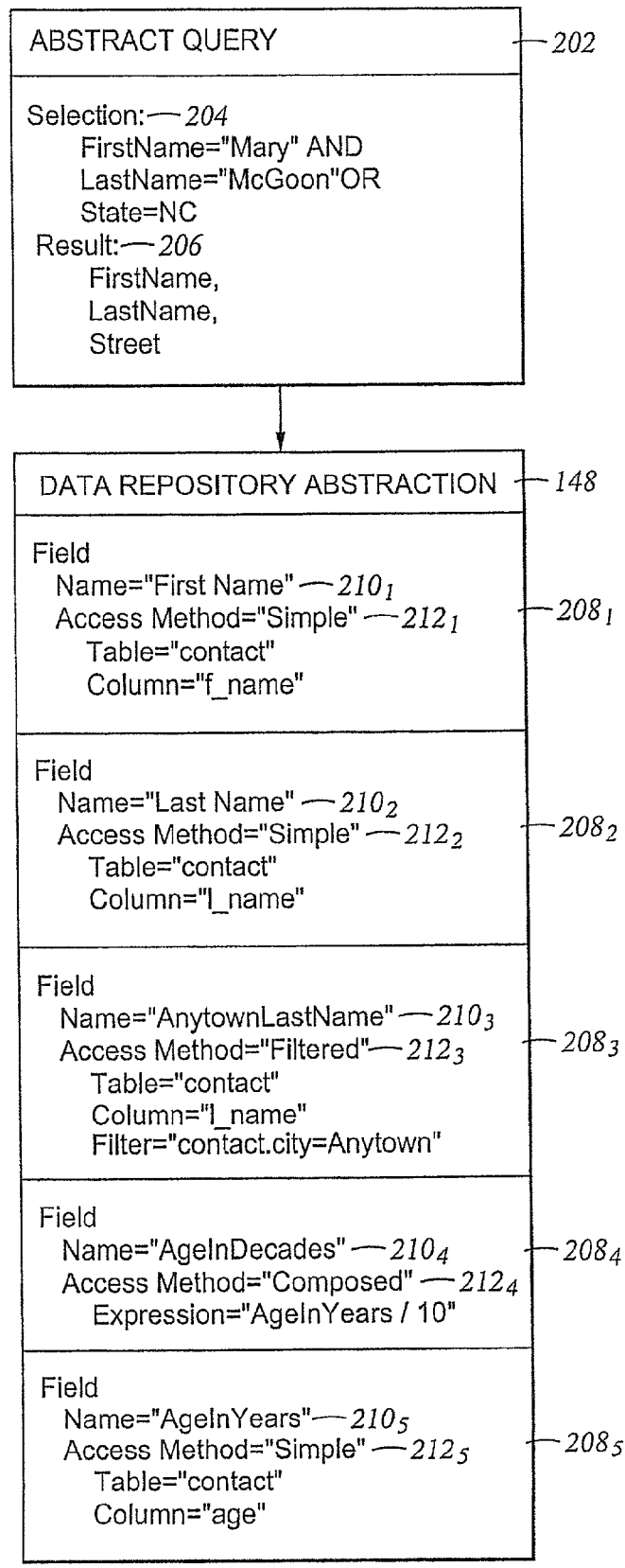
FIG. 2C is one embodiment of an abstract query and a data repository abstraction for a relational data access.

Referring now to FIG. 2C, which shows an exemplary abstract query and data repository abstraction for a relational data access. The data repository abstraction component 148 comprises a plurality of logical field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification preferably comprises a plurality of specification sub-fields, each specification sub-field being associated with a sub-field identifier. Each specification sub-field has a possible value, which may be an array of ASCII- and/or Text-characters forming sub-field content and which may be encoded. Accordingly, each of the illustrated field specifications $208_1$, $208_2$, $208_3$, $208_4$ and $208_5$ comprises a sub-field representing a logical field name $210_1$, $210_2$, $210_3$, $210_4$, $210_5$ (collectively, field name 210) identified by a corresponding sub-field identifier "Name". Each of the illustrated field specifications $208_1$, $208_2$, $208_3$, $208_4$ and $208_5$ further comprises a sub-field representing an associated access method $212_1$, $214_2$, $212_3$, $212_4$, $212_5$ (collectively, access method 212) identified by a corresponding sub-field identifier "Access Method". The access methods associate (i.e., map) the logical field names to a particular physical data representation 214 in a database (e.g., one of the databases 156).

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2C maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2C in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information that does not exist in the underlying data representation may be computed. In the example illustrated in FIG. 2C the composed field access method $212_3$ maps the logical field name $210_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute, which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 148 shown in FIG. 2C are representative of logical fields mapped to data represented in the relational data representation $214_2$. However, other instances of the data repository abstraction component 148 map logical fields to other physical data representations, such as XML. Further, in one embodiment, a data repository abstraction component 148 is configured with access methods for procedural data representations. One embodiment of such a data repository abstraction component 148 is described below with respect to FIG. 8.

An illustrative abstract query corresponding to the abstract query 202 shown in FIG. 2C is shown in Table I below. By way of illustration, the data repository abstraction 148 is defined using XML. However, any other language may be used to advantage.

TABLE I

QUERY EXAMPLE

```
001   <?xml version="1.0"?>
002   <!--Query string representation: (FirstName = "Mary" AND LastName =
003   "McGoon") OR State = "NC"-->
004   <QueryAbstraction>
005     <Selection>
006       <Condition internalID="4">
007         <Condition field="FirstName" operator="EQ" value="Mary"
008   internalID="1"/>
009         <Condition field="LastName" operator="EQ" value="McGoon"
010   internalID="3" relOperator="AND"></Condition>
011       </Condition>
012       <Condition field="State" operator="EQ" value="NC" internalID="2"
```

TABLE I-continued

QUERY EXAMPLE

```
013    relOperator="OR"></Condition>
014    </Selection>
015    <Results>
016       <Field name="FirstName"/>
017       <Field name="LastName"/>
018       <Field name="State"/>
019    </Results>
020  </QueryAbstraction>
```

Illustratively, the abstract query shown in Table I includes a selection specification (lines 005–014) containing selection criteria and a results specification (lines 015–019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative instance of a data repository abstraction component 148 corresponding to the abstract query in Table I is shown in Table II below. By way of illustration, the data repository abstraction component 148 is defined using XML. However, any other language may be used to advantage.

taining. Therefore, the generation of logical field specifications may be automated according to an aspect of the present invention to advantageously minimize the workload. Accordingly, at least a portion of the data repository abstraction 148 is externally described and/or dynamically generated. In one embodiment, such an external description or definition of logical field specifications may be obtained using a querying or a parsing procedure, comprising an SQL query or a parsing procedure programmed in any programming language such as, for instance, C, C++ and JAVA. In one embodiment, the querying or parsing procedure would access a database table to collect the information needed to dynamically generate a logical field specification or one or more dynamic sub-field(s) of a static or dynamic logical field specification. This aspect of the present invention

TABLE II

DATA REPOSITORY ABSTRACTION EXAMPLE

```
001   <?xml version="1.0"?>
002   <DataRepository>
003      <Category name="Demographic">
004         <Field queryable="Yes" name="FirstName" displayable="Yes">
005            <AccessMethod>
006               <Simple columnName="f_name" tableName="contact"></Simple>
007            </AccessMethod>
008            <Type baseType="char"></Type>
009         </Field>
010         <Field queryable="Yes" name="LastName" displayable="Yes">
011            <AccessMethod>
012               <Simple columnName="l_name" tableName="contact"></Simple>
013            </AccessMethod>
014            <Type baseType="char"></Type>
015         </Field>
016         <Field queryable="Yes" name="State" displayable="Yes">
017            <AccessMethod>
018               <Simple columnName="state" tableName="contact"></Simple>
019            </AccessMethod>
020            <Type baseType="char"></Type>
021         </Field>
022      </Category>
023   </DataRepository>
```

The foregoing examples are related to statically defined logical field specifications comprising statically defined sub-fields identified by corresponding sub-field identifiers. To modify an expression or a possible value of one of the above-described statically defined sub-fields, a user would be required to update the corresponding sub-field. Furthermore, if an underlying physical representation changes and a new logical field specification must be created for an existing data repository abstraction 148, the user would be required to create this logical field specification. In case a large number of logical field specifications defined by the data abstraction layer must be maintained and is subject to frequent changes, a significant workload may arise in maintaining.

relating to a dynamic generation will now be explained in more detail with respect to FIG. 2D.

Figure 2D:
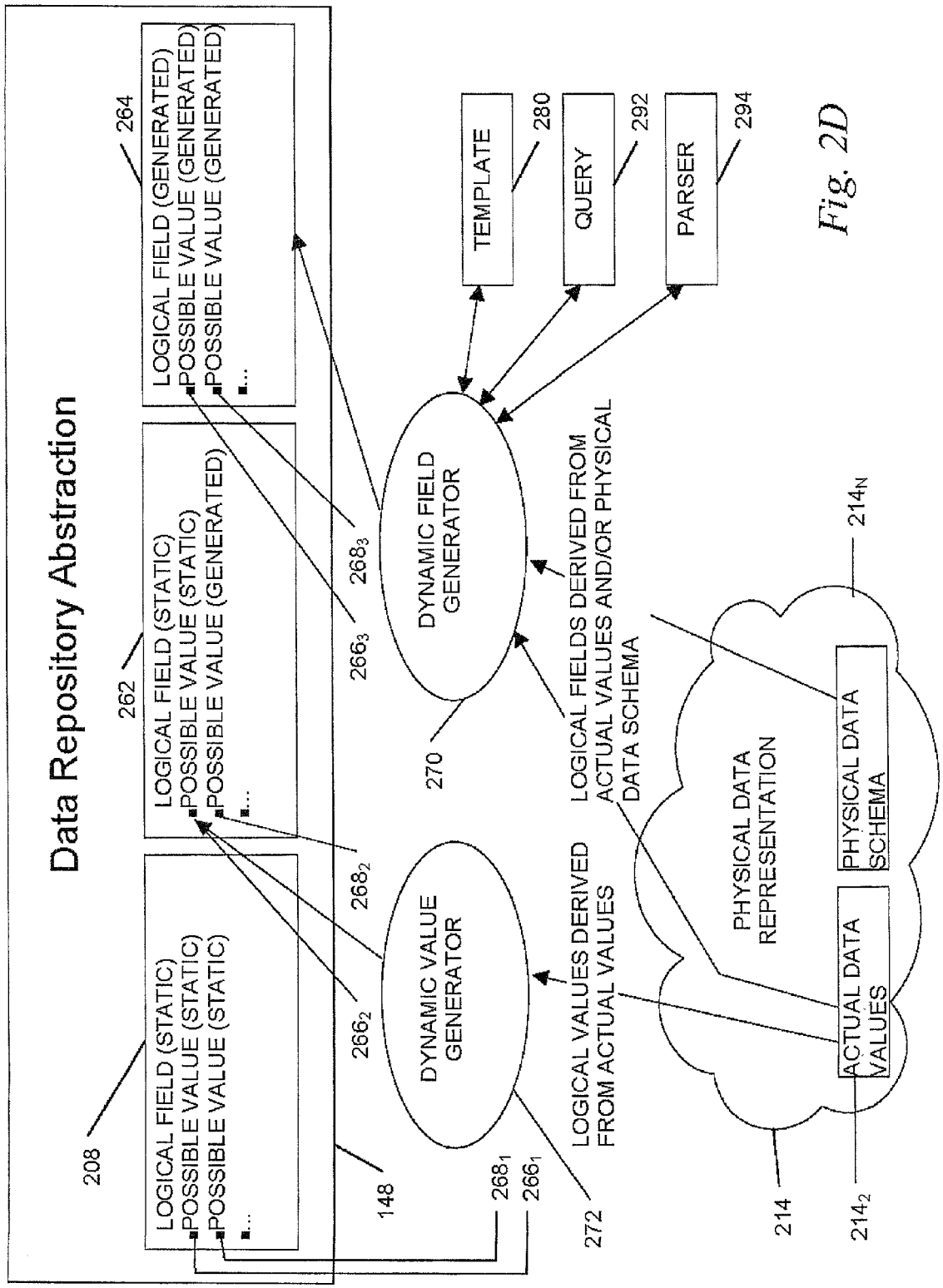
FIG. 2D is an illustration of dynamic field/value generation.

FIG. 2D shows an illustration of an automated generation of logical field specifications 262, 264 comprising static and dynamic sub-fields. Data repository abstraction 148 illustratively comprises three different logical field specifications 208, 262, 264. Logical field specification 208 corresponds to one of the statically defined logical field specifications $208_1$, $208_2$, $208_3$, $208_4$ and $208_5$ as described above with respect to FIG. 2C, which comprise statically defined sub-fields having statically defined possible values $266_1$, $268_1$. Logical field specification 262 is also statically defined and illustratively comprises a statically defined sub-field having a statically defined possible value 266₂ and a generated sub-field having a generated possible value 268₂. Logical field specification 264 is generated and illustratively comprises generated sub-fields having generated possible values 266₃, 268₃.

According to one aspect, a logical field specification is dynamically derived when an instance of the data repository abstraction 148 is loaded by an application (e.g. application 140) to access a particular entity in the underlying physical data representation (e.g., a field mapped to a given database table and column). For dynamically generating the logical field specification for a logical field associated with a physical entity of data in the computer system, a dynamic field generator 270 is used. The dynamic field generator 270 uses a logical field specification template 280 and accesses actual data values in a particular physical data representation 214, e.g. a relational data representation 214₂, to generate a required logical field specification.

The logical field specification template comprises a plurality of specification sub-fields. These specification sub-fields could be static sub-fields or dynamic sub-fields. Each specification sub-field may be identified by a corresponding sub-field identifier and may be designated by a sub-field descriptor. The plurality of sub-field descriptors preferably comprises at least one of a category name indicating the category of the logical field, a logical field name designating the logical field, an access method specifying at least a method for accessing the physical entity of data, a logical field identifier uniquely identifying the logical field and a logical field description describing the content of the logical field. The access method may further specify a location for accessing the physical entity of data.

Using the sub-field descriptors, the physical entity of data can be accessed to determine data items associated with the sub-field descriptors, so that each specification sub-field may be linked to a corresponding determined data item. An illustrative example of a logical field specification template is shown in Table III below. By way of illustration, the logical field specification template example is defined using XML. However, any other language may be used to advantage.

called "TestFieldGenerator" (line 001) that will return a set of data items. In this case, the JAVA program is given a SQL query (lines 002–003) to execute against the table "Test_Tbl" that contains data related to the specific test, i.e., at least a list of test field names "catname", a description "fielddesc" for each, a key value "fieldkey" used to lookup values for a corresponding test in another table and a named category "catname" to group each particular test under.

The sub-field descriptors are used to determine data items in table "Test_Tbl" that are associated with the sub-field descriptors. In this case, the JAVA program will execute the SQL query "SELECT catname, fieldname, fieldkey, fielddesc FROM Test Tbl". SQL query 290 is used to determine data items in the table "Test_Tbl" that are associated with the sub-field descriptors "catname", "fieldname", "fieldkey" and "fielddesc". The JAVA program will create a logical field specification for each row returned by the query, in effect, generating a logical field specification for each kind of test. In this case, "fieldkey" is used to build a unique access method definition for each logical test field. Furthermore, "catname" is used to indicate a category of a corresponding logical field specification and provides for a grouping of plural logical field specifications under one category.

Including a sub-field relating to a category, i.e., the sub-field associated with the sub-field descriptor "catname", may provide a deferred expansion feature to a corresponding data repository abstraction. Accordingly, logical field specifications of the corresponding data repository abstraction, which relate to a specific category, may only be expanded, i.e., generated, if reference is made to the category. Reference to the category may, for instance, be made by the requesting entity (e.g., one of the applications 140 of FIG. 1) when issuing a query 202. Additionally, a data repository abstraction may be used by more than one application, wherein logical field specifications within the data repository abstraction are grouped such, that an application may only reference a specific category when accessing the data repository abstraction to create only the logical field specifications grouped under the specific category.

According to another aspect, the dynamic field generator 270 may use a logical field specification template as

TABLE III

LOGICAL FIELD SPECIFICATION TEMPLATE EXAMPLE

```
001   <DynamicEntity className="com.ibm.dqa.abstractdata.TestFieldGenerator">
002     <Parm fieldName="QueryStatement" value="SELECT catname,
003   fieldname, fieldkey, fielddesc FROM Test_Tbl"/>
004     <Parm fieldName="CategoryName" value="catname"/>
005     <Parm fieldName="FieldName" value="fieldname"/>
006     <Parm fieldName="FieldKey" value="fieldkey"/>
007     <Parm fieldName="FieldDesc" value="fielddesc"/>
008   </DynamicEntity>
```

Illustratively, the logical field specification template shown in Table III comprises four static sub-fields (lines 004–007), which are identified by sub-field identifiers "CategoryName", "FieldName", "FieldKey" and "FieldDesc". These sub-fields are designated by sub-field descriptors "catname", "fieldname", "fieldkey" and "fielddesc".

As can also be seen from Table III, the actual data values to be accessed in the physical entity of data in order to derive corresponding data items dynamically, are in a table "Test_Tbl" in the relational data representation 214₂ containing data related to a specific test. By way of example, the table "Test_Tbl" is accessed by invoking a JAVA program described above with respect to Table III and access a physical data schema in a particular physical data representation 214 representing, e.g., metadata in any physical data representation 214ₙ, known or unknown, to generate a required logical field specification. In this case, the accessing of the physical entity of data comprises determining a structure of the physical entity of data, e.g., by invoking a parser 292 for parsing the physical entity of data. The invoking of a parser may comprise launching one of a C, a C++ and a JAVA parsing procedure. It should, however, been noted that using a parsing procedure programmed in any programming language, known or unknown, is contemplated and that such a parsing procedure may also be applied to a table in a relational data representation 214₂.

The linking of each specification sub-field to a corresponding data item determined from actual data values or a physical data schema comprises replacing the sub-field descriptor designating a corresponding specification sub-field with the determined data item.

Furthermore, if the plurality of specification sub-fields comprises at least one dynamic value sub-field designated by a dynamic value sub-field descriptor, the physical entity of data is accessed to determine a plurality of data items associated with the dynamic value sub-field descriptor; and the at least one dynamic value sub-field is linked to the determined plurality of data items.

An illustrative example of a generation procedure for a logical field specification comprising a dynamic value sub-field including a dynamically generated possible value is shown in Table IV below. For purposes of illustration, a dynamic value sub-field is generated in a statically defined logical field specification, e.g. logical field specification 262 of FIG. 2D. However, it should be noted that the dynamic value sub-field may also be generated in a dynamically defined logical field specification, e.g. logical field specification 264 of FIG. 2D. By way of illustration, the dynamic value generation example is defined using XML. However, any other language may be used to advantage.

plated. In the illustrated example the JAVA application "GeneralSQLBasedDynamicValue" is called.

The JAVA application is passed three parameters: an SQL query to execute, the sub-field descriptor representing the name of the column returned by the query containing an external form of each possible value and another column identifying an internal form of each possible value. In the present case, the query selects all rows from a database table that define the various race/ethnic group values. The "description" column in the table contains an end user appropriate description of the ethnic group (like Hispanic). The "lw_field" column in the table contains the encoded, internal value used to represent the given ethnic group in the WHDEMOGRAPHIC table (e.g. "5" to represent "Hispanic").

Using the example shown in Table IV, metadata describing a particular data repository abstraction layer may be modified to dynamically derive data items representing possible values from a corresponding physical entity of data to be included in an associated logical field specification.

In some cases it may be desirable to refresh a data repository abstraction or parts thereof. For example, refreshing may be desirable when changes to the physical entity of data associated with a static or generated logical field specification occur during use of the static or generated logical field specification. Accordingly, one embodiment

TABLE IV

DYNAMIC VALUE GENERATION EXAMPLE

```
001    <Field queryable="Yes" name="Race" displayable="Yes" outputTranslate="Yes"
002    translateFunction="ibmwarehouse.RaceMap">
003      <AccessMethod>
004        <Simple columnName="RACE_CDE"
005    tableName="WHDEMOGRAPHIC"></Simple>
006      </AccessMethod>
007      <Type baseType="char">
008        <List>
009          <DynamicValue className=
010    "com.ibm.dqa.abstractdata.GeneralSQLBasedDynamicValue">
011            <Parm fieldName="SQLQueryStmt"value="SELECT DISTINCT
012    description, lw_field FROM WHRaceMapping ORDER BY
013    description"/>
014            <Parm fieldName="ValueColumn" value="description"/>
015            <Parm fieldName="InternalValueColumn" value="lw_field"/>
016          </DynamicValue>
017        </List>
018      </Type>
019      <Description>Race or ethnic group</Description>
020    </Field>
```

Illustratively, the logical field specification is designated "Race" (line 001) in the present example and represents the ethnic group associated with an individual. An <AccessMethod> section (lines 003–006) defines that this logical field specification is to be mapped to a column "RACE_CDE" of a table "WHDEMOGRAPHIC" in a database. A <Type> section (line 007) indicates that the underlying data type for the dynamic sub-field is "char". A <List> section (lines 008–017) indicates that this dynamic sub-field has a defined list of possible values that are dynamically generated. This could also be a static list of values, but in this case, a <DynamicValue> section (lines 009–016) indicates that the set of values are to be derived, for instance, by calling a JAVA application. It should, however, be noted that the application may be programmed in any other programming language, like C or C++, for instance, and that any further programming language, known or unknown, is contemallows for automatically or dynamically refreshing the logical field specification or the one or more dynamic sub-field(s) of a static or dynamic logical field specification. In one embodiment, refreshing comprises generating the dynamically generated logical field specification or one or more dynamic sub-field(s) of a static or dynamic logical field specification in the manner described above.

In one embodiment, a dynamically generated logical field specification or one or more dynamic sub-field(s) of a static or dynamic logical field specification may comprise an attribute representing a refresh rate indicating a pre-determined time interval. When a data repository abstraction comprising one or more logical field specifications is accessed, a refreshing background thread or task may be initiated. The refreshing background thread monitors the time when the data repository abstraction is accessed and refreshes the dynamically generated logical field specification or one or more dynamic sub-field(s) of a static or dynamic logical field specification when the pre-determined time interval is expired.

Refreshing the dynamically generated logical field specification or one or more dynamic sub-field(s) of a static or dynamic logical field specification may also be initiated when modifying the corresponding physical entity of data. In this case, a monitoring procedure may be used to determine changes to the physical data and to automatically initiate refreshing of the dynamically generated logical field specification or one or more dynamic sub-field(s) of a static or dynamic logical field specification.

Furthermore, specific tools for updating data repository abstractions may be provided, which are suitable to update a data repository abstraction or to cause the data repository abstraction to update itself, so that the corresponding dynamically generated logical field specification or one or more dynamic sub-field(s) of a static or dynamic logical field specification is dynamically refreshed.

Figure 3:
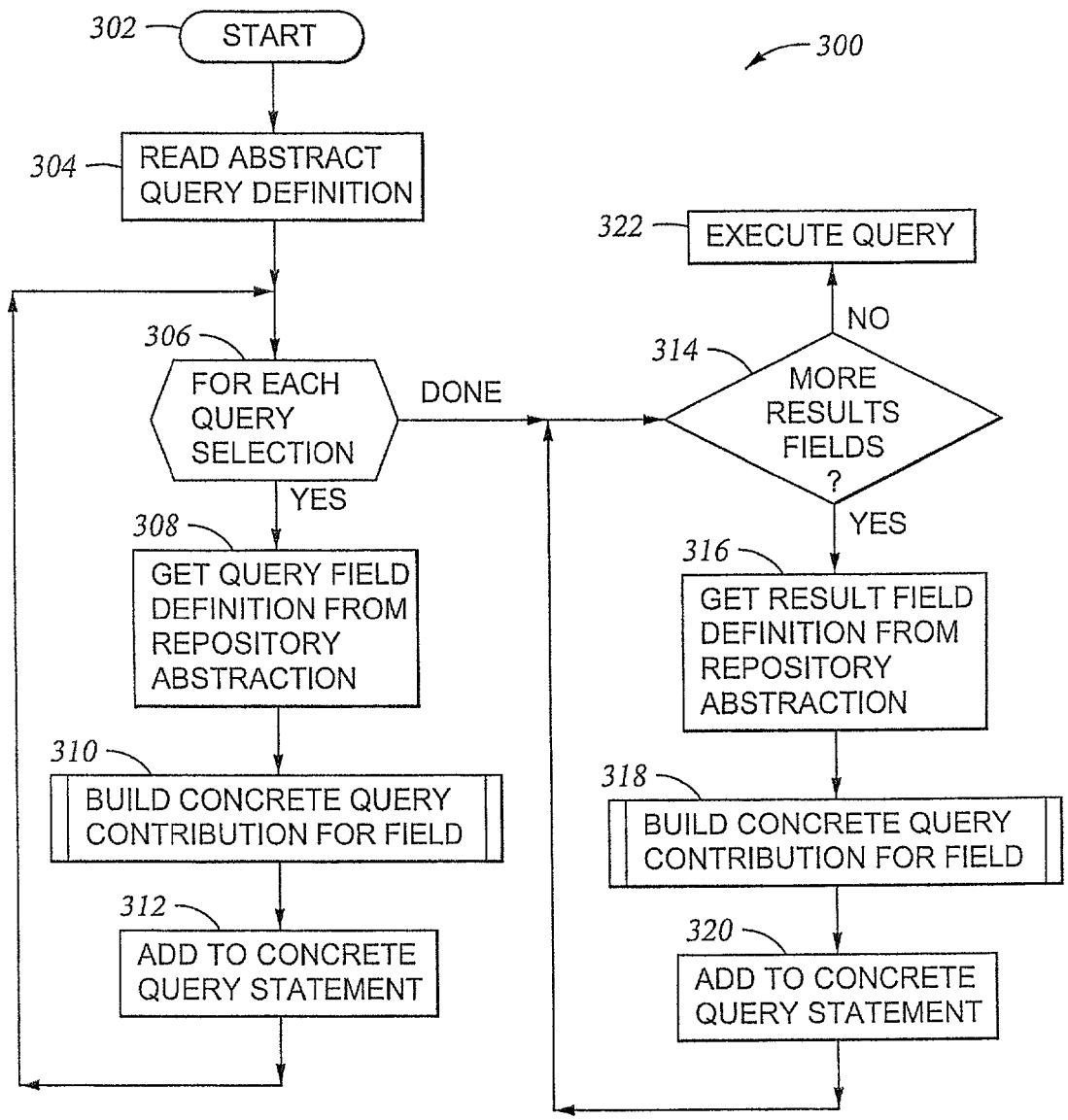
FIG. 3 is a flow chart illustrating the operation of a runtime component.

FIG. 3 shows an illustrative runtime method 300 exemplifying one embodiment of the operation of the runtime component 150. The method 300 is entered at step 302 when the runtime component 150 receives as input an instance of an abstract query (such as the abstract query 202 shown in FIG. 2C). At step 304, the runtime component 150 reads and parses the instance of the abstract query and locates individual selection criteria and desired result fields. At step 306, the runtime component 150 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 150 uses the field name from a selection criterion of the abstract query to look up the definition of the field in the data repository abstraction 148. As noted above, the field definition includes a definition of the access method used to access the physical data associated with the field. The runtime component 150 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from a physical data repository, represented by the databases 156–157 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 150 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 150 looks up a result field name (from the result specification of the abstract query) in the data repository abstraction 148 and then retrieves a Result Field Definition from the data repository abstraction 148 to identify the physical location of data to be returned for the current logical result field. The runtime component 150 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
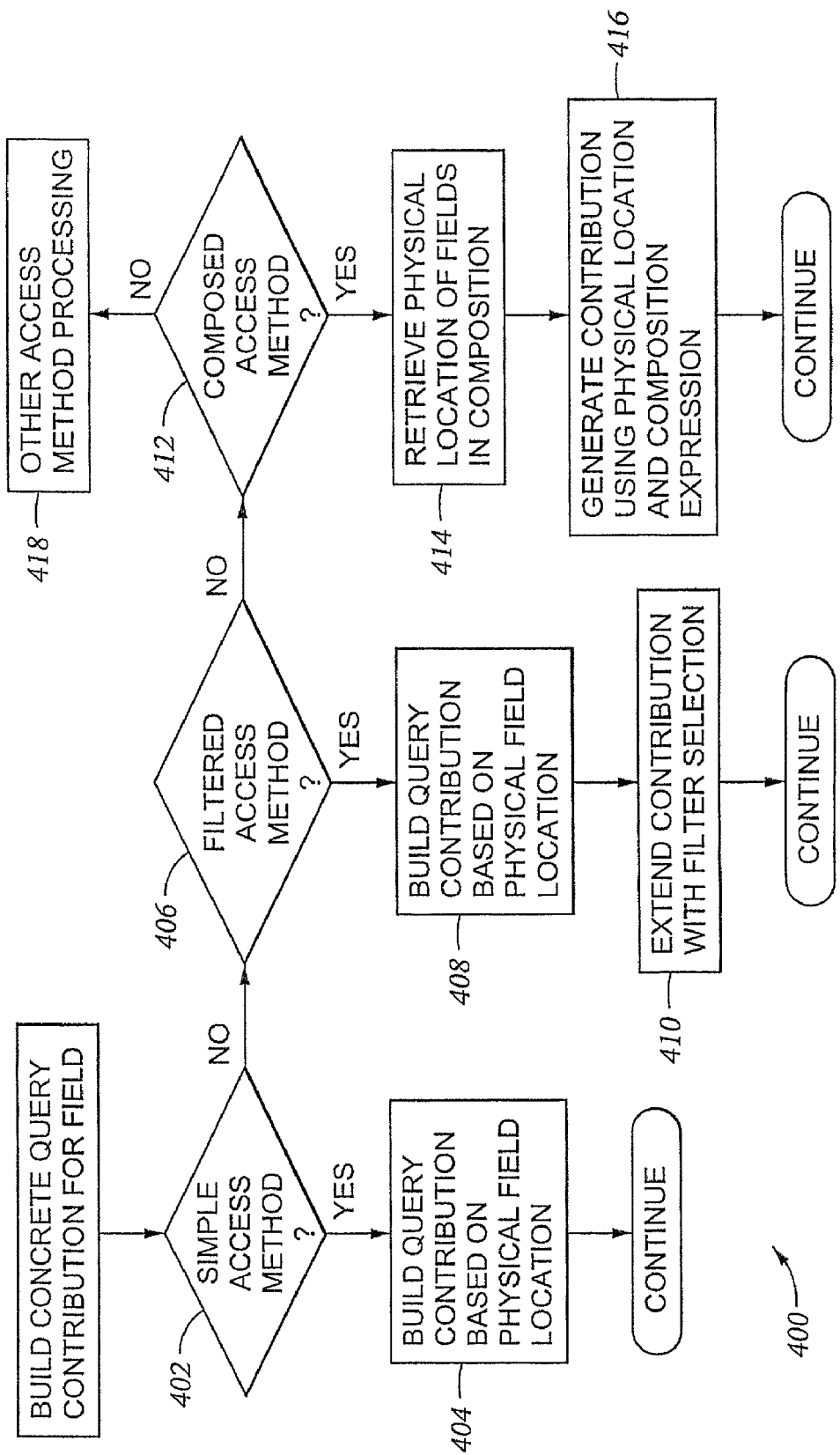
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

Other Embodiments of Data Repository Abstraction Components

In any case, a data repository abstraction component 148 contains (or refers to) at least one access method which maps a logical field to physical data. To this end, as illustrated in the foregoing embodiments, the access methods describe a means to locate and manipulate the physical representation of data that corresponds to a logical field.

In one embodiment, the data repository abstraction component 148 is extended to include description of a multiplicity of data sources that can be local and/or distributed across a network environment. The data sources can be using a multitude of different data representations and data access techniques. In one embodiment, this is accomplished by configuring the access methods of the data repository abstraction component 148 with a location specification defining a location of the data associated with the logical field, in addition to the method used to access the data.

Figure 5:
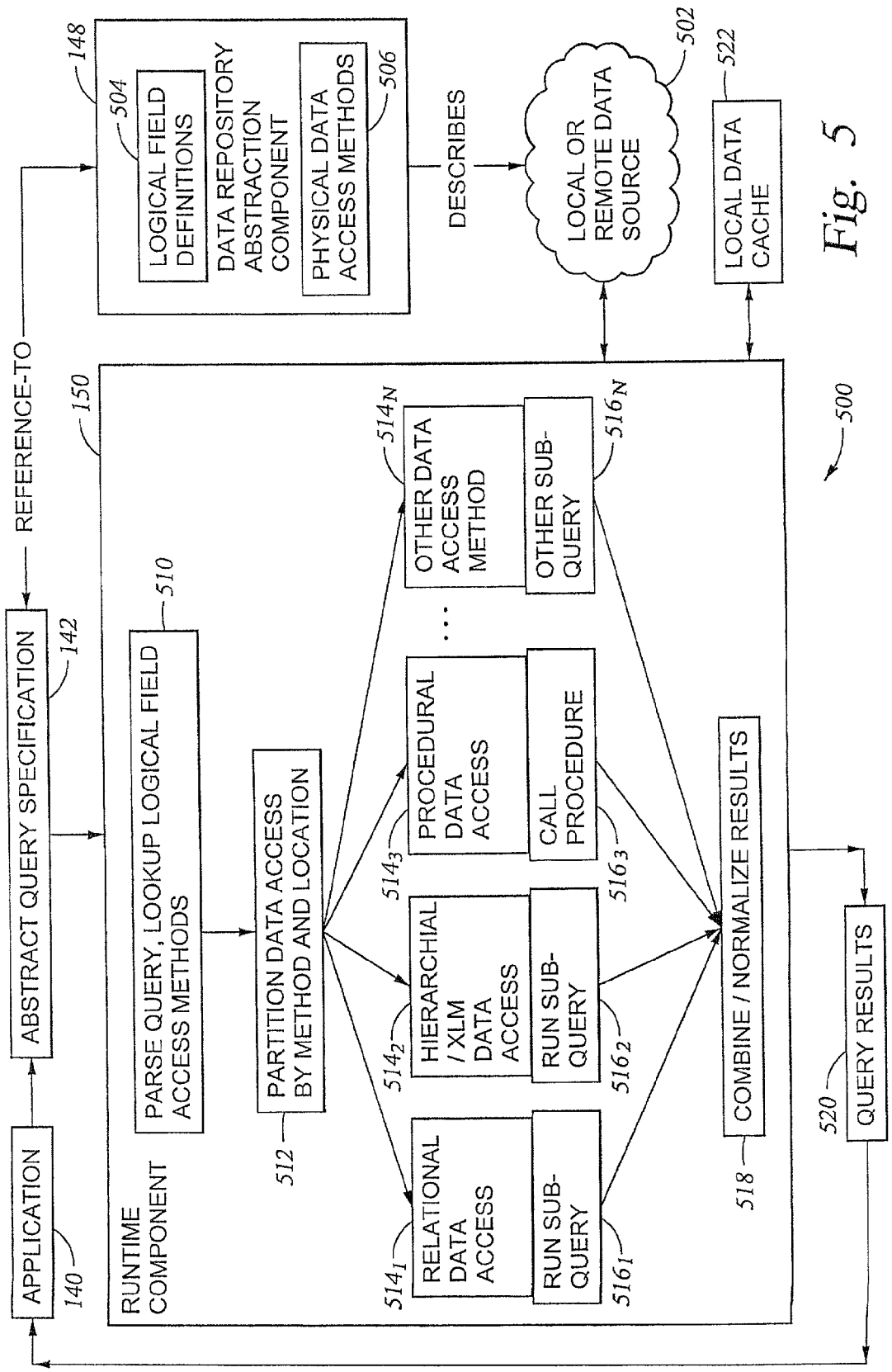
FIG. 5 is an illustrative relational view of software components in which multiple sources of data are accessible.

Referring now to FIG. 5, a logical/runtime view of an environment 500 having a plurality of data sources (repositories) 502 is shown and illustrates one embodiment of the operation of a data repository abstraction component 148 in such an environment. The data sources 502 to be accessed via the data repository abstraction component 148 may be local, remote or both. In one embodiment, the data sources 502 are representative of the databases 156–157 shown in FIG. 1. In general, the data repository abstraction component 148 is similarly configured to those embodiments described above. As such, the data repository abstraction component 148 has logical field definitions and an associated access method for each logical field definition. However, in contrast to other embodiments in which only a single data source is accessed, the access methods are now configured with location specifications in addition to physical representation specifications. The location specifications describe the location (i.e., the data source) in which the data to be accessed (i.e., the data associated with the logical field definitions) is located. However, in one embodiment, it is contemplated that some access methods may be configured without location specifications, indicating a default to a local data source.

In general, FIG. 5 shows the application 140, the abstract query specification 142 (also referred to herein as the application query specification), the data repository abstraction component 148 (used to map logical fields to access methods) and the runtime component 150 responsible for converting an abstract query into one or more data access requests supported by the data repositories 502 containing the physical information being queried. In contrast to some embodiments described above, the data repository abstraction component 148 and runtime component 150 of FIG. 5 are configured to support the definition and query of logical fields having associated data that may be distributed across multiple local and/or remote physical data repositories 502 (also referred to herein as local/remote data sources 502) and which may be accessed via a multitude of query-based and procedural based interfaces.

To this end, the application 140 defines its data requirements in terms of the abstract query specification 142 which contains query selection and/or update logic based on logical fields, not the physical location or representation of the actual data involved. The data repository abstraction component 148 comprises logical field definitions 504 and an access method 506 for each logical field. The logical field definitions 504 describe the logical fields available for use by the application 140. In one aspect, the data repository abstraction component 148 governs the information available for use by the application 140. Addition of new logical fields, presented in a new local or remote data source, are thereby made available for use by applications. Each of the access methods 506 define the mapping between a logical field and its physical representation in a local/remote data source 502. This relationship may be understood with reference to FIG. 6.

Figure 6:
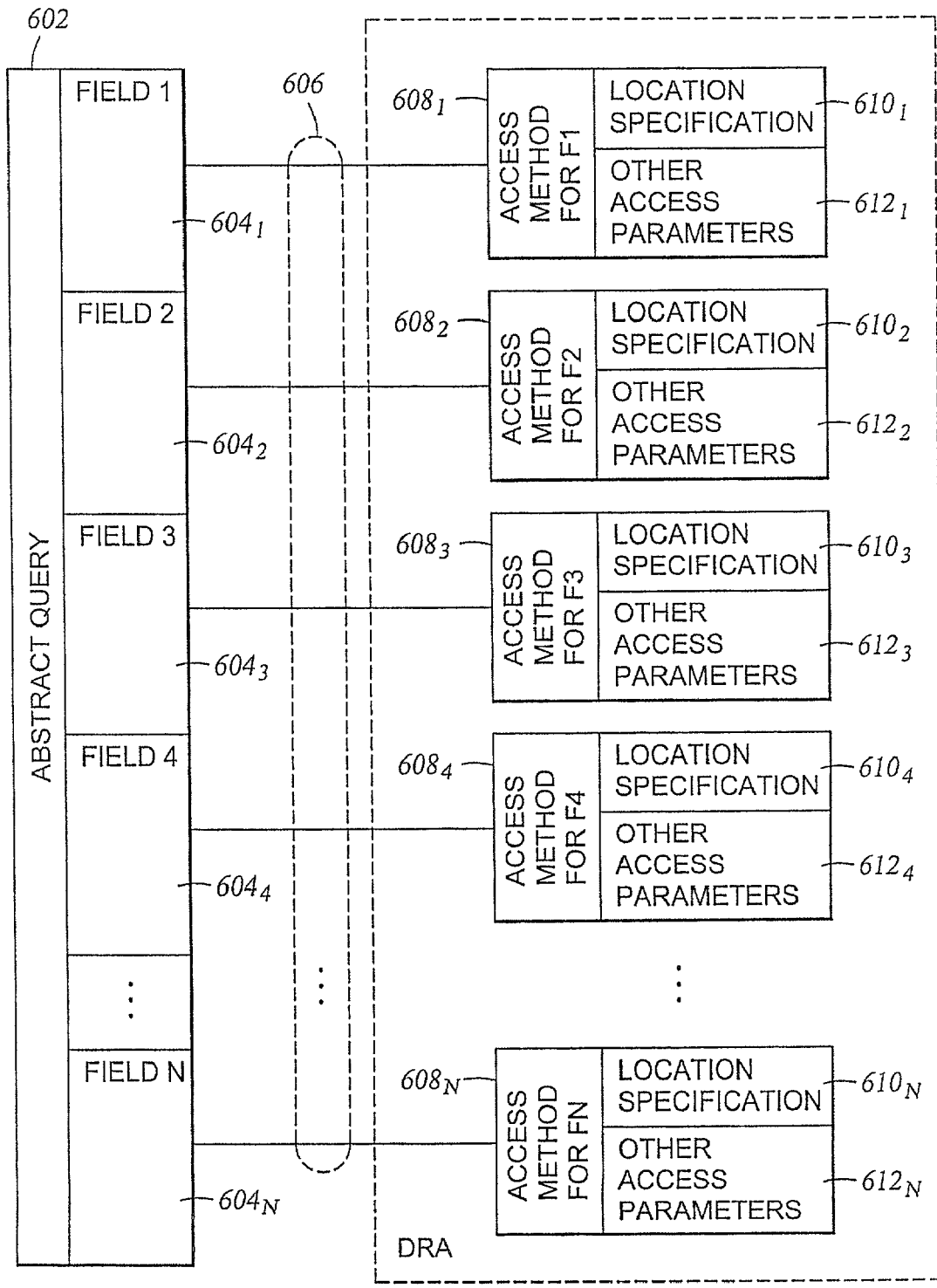
FIG. 6 is an illustrative abstract query comprising a plurality of logical fields.

FIG. 6 shows an illustrative abstract query 602 comprising a plurality of logical fields $604_1 \ldots 604_N$ (collectively the logical fields 604). Each of the logical fields 604 are related (represented by lines 606) to an access method $608_1 \ldots 608_N$ (collectively the access methods 608) by the definition of the particular data repository abstraction component 148. Physical representation information in the access methods 608 includes the name of the access method to be used (here represented as "access method for F1", "access method for F2", etc.) and a plurality of parameters to be passed to the named access method and which describe how to access the physical data associated with the logical field. In general, such parameters include a locator parameter $610_1 \ldots 610_N$ (collectively the locator parameters 610; also referred to herein as a location specification) and other access parameters needed to access the data. A given data repository abstraction component instance may represent information that is managed by multiple local and remote physical data repositories.

Illustrative embodiments in which a data repository abstraction component instance may be configured with a location specification and other access parameters needed to access the data are shown in FIGS. 7–8. Referring first to FIG. 7, a field specification 700 of a data repository abstraction component configured with a relational access method is shown. The field specification 700 is specific to a particular logical field identified by a field name 702 "CreditRatingDescription" and having an associated access method. The associated access method name 704 is "simple-remote" indicating that the access method is a simple field access method in which the logical fields are mapped directly to a particular entity in the underlying physical data representation and that the data is remotely located. In this case, the logical field is mapped to a given database table "credit_t" and column "desc". The "URL" is the location specification (locator parameter) which specifies the location of the physical data. In this case, the "URL" includes an identifier of a JDBC driver to use, a remote system name holding the data (remotesystem.abc.com) and a database schema containing the data (creditschema). "JDBC Driver" is the name of the Java class that implements SQL access to this type of remote database.

Referring now to FIG. 8, a field specification 800 of a data repository abstraction component configured with a procedural access method is shown. The field specification 800 is specific to a particular logical field identified by a field name 802 "CreditRating" and having an associated access method. The associated access method name 804 is "procedural" indicating that the access method is a procedural access method. "Service Spec" identifies the Web Services Description Language (WSDL) definition for the web service to access. WSDL is a standard interface definition language for Web Services. Web Services is a standard method used to invoke software applications using the established Web infrastructure for communication and using standard data representation technologies such as XML to represent information passed between a calling application and the Web Service that is invoked. "Service Name" identifies the name of the web service to be accessed out of the set of possible services defined within the "Service Spec". "Port Name"

identifies the port name for the service to be accessed out of the set of possible port names defined within "Service Name". The named port defines the network address for the service. "Operation" is the name of the operation to invoke. Web Services can support more than one function referred to as "operations". "Input" identifies input required when invoking a web service. In this case, a last name value is provided as input to the service. "Output" identifies the output data item that is associated with this logical field. Services may return several pieces of output when they are called. Accordingly "Output" identifies defines the piece of output data that is associated with the current logical field.

Note that in the case of procedural access methods, the field specification of a data repository abstraction component for local data may look substantially identical to the field specification 800 shown in FIG. 8 for accessing remote data. The only difference would be that in the local case the referenced WSDL document would have a URL pointing back to the local server the service is running on.

Referring again to FIG. 5, one embodiment of the operation of the runtime component 150 is now described. In general, the runtime component is responsible for building and executing an executable query based on an abstract query. To this end, at block 510, the runtime component 150 parses the abstract query and uses the data repository abstraction component 148 to map references to one or more logical fields to their corresponding physical location and method of access (collectively referred to herein as the access methods 506). In one embodiment, the runtime component 150 partitions (block 512) overall physical data query requirements into groups (referred to as "sub-queries" 514) representing access to the same physical resource using the same method of access. The "sub-queries" are then executed (block 516). Results from each of the sub-queries 514 are combined and normalized (block 518) before the collective query results 520 are returned to the application 140. In one aspect, this query partitioning approach allows the runtime component 150 to run multiple sub-queries in parallel, taking advantage of multi-CPU hardware architectures.

In one embodiment, the runtime component 150 also manages a local data cache 522. The local data cache 522 contains data retrieved for certain logical fields and is used during subsequent queries as a first choice for lookup of logical fields that were identified in the data repository abstraction component as being cache enabled. Logical fields that are advantageously managed in a cached fashion are those whose values are relatively static and/or which incur significant overhead to access (where overhead is measured in either time required to fetch the data or monetary expense of accessing the data, assuming some information is managed in a pay-per-use model).

In various embodiments, numerous advantages over the prior art are provided. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the ease-of-use for the application builder and the end-user is facilitated. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

Further, the presence of multiple data sources can be used advantageously. By configuring the data repository abstraction components with location specifications, multiple data sources can be accessed, whether the data sources are local or remote. In this manner, an infrastructure is provided which is capable of capitalizing on the distributed environments prevalent today.

Solutions implementing this model use the provided abstract query specification to describe its information requirements, without regard for the location or representation of the data involved. Queries are submitted to the runtime component which uses the data repository abstraction component to determine the location and method used to access each logical piece of information represented in the query. In one embodiment, the runtime component also includes the aforementioned data caching function to access the data cache.

In one aspect, this model allows solutions to be developed, independent of the physical location or representation of the data used by the solution, making it possible to easily deploy the solution to a number of different data topologies and allowing the solution to function in cases where data is relocated or reorganized over time. In another aspect, this approach also simplifies the task of extending a solution to take advantage of additional information. Extensions are made at the abstract query level and do not require addition of software that is unique for the location or representation of the new data being accessed. This method provides a common data access method for software applications that is independent of the particular method used to access data and of the location of each item of data that is referenced. The physical data accessed via an abstract query may be represented relationally (in an existing relational database system), hierarchically (as XML) or in some other physical data representation model. A multitude of data access methods are also supported, including those based on existing data query methods such as SQL and XQuery and methods involving programmatic access to information such as retrieval of data through a Web Service invocation (e.g., using SOAP) or HTTP request.

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operation are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer-implemented method of dynamically generating a logical field specification for a logical field associated with a physical entity of data in a computer system, the physical entity of data having a particular physical data representation, the method comprising:

providing a logical field specification template comprising a plurality of specification sub-fields, each specification sub-field designated by a sub-field descriptor;

accessing the respective physical entities of data to determine data items associated with the sub-field descriptors of each specification sub-field;

linking each specification sub-field to a corresponding determined data item; and generating, based on the corresponding determined data items linked to the specification sub-fields, logical field specifications, each logical field specification specifying a logical field name, at least one location attribute identifying a location of physical data, and a reference to an access method selected from at least two different access method types, wherein each of the different access method types defines a different manner of exposing the physical data to a user, wherein at least one of the generated logical field specifications contains a reference to a first access method type which exposes the respecitive physical data in its native physical form, and at least one of the generated logical field specifications contains a reference to a second access method type which requires the respective physical data to be input to an expression, the result of which expression is exposed to the user; wherein values for at least the logical field names and location attributes are provided by the corresponding determined data items.

2. The method of claim 1, wherein the linking of each specification sub-field to a corresponding determined data item comprises replacing the sub-field descriptor designating a corresponding specification sub-field with the determined data item.

3. The method of claim 1, wherein the plurality of specification sub-fields comprises at least one dynamic value sub-field designated by a dynamic value sub-field descriptor, the method further comprising:

accessing the physical entity of data to determine a plurality of data items associated with the dynamic value sub-field descriptor;

linking the at least one dynamic value sub-field to the determined plurality of data items.

4. The method of claim 1, further comprising:

combining a plurality of logical fields in at least one data repository abstraction adapted for use by a software application for accessing the physical entity of data.

5. The method of claim 1, wherein the accessing comprises querying the physical entity of data using a predefined Structured Query Language (SQL) query defined in the logical field specification template.

6. The method of claim 1, wherein the plurality of sub-field descriptors comprises at least one of a category name indicating the category of the logical field, the logical field name designating the logical field, the access method specifying at least a method for accessing the physical entity of data, a logical field identifier uniquely identifying the logical field and a logical field description describing the content of the logical field.

7. The method of claim 1, wherein the accessing comprises determining a structure of the physical entity of data.

8. The method of claim 7, wherein the determining of a structure comprises launching one of a C, a C++ and a JAVA parsing procedure.

9. A method of providing access to a physical entity of data in a computer system, the physical entity of data having a particular physical data representation, the method comprising:

providing a logical field specification template comprising a plurality of specification sub-fields, each specification sub-field designated by a sub-field descriptor;

accessing the respective physical entities of data to determine data items associated with the sub-field descriptors of each specification sub-field;

linking each specification sub-field to a corresponding determined data item to generate a respective logical field specification, wherein each logical field specification specifies a logical field name, at least one location attribute identifying a location of physical data, and a reference to an access method selected from at least three different access method types, wherein each of the different access method types defines a different manner of exposing the physical data to a user, wherein at least one of the generated logical field specifications contains a reference to a first access method type which exposes the respective physical data in its native physical form, and at least one of the generated logical field specifications contains a reference to a second access method type which requires the respective physical data to be input to an expression, the result of which expression is exposed to the user; wherein value for at least the logical field names and location attributes are provided by the corresponding determined data items; and providing, for a requesting entity, a query specification comprising a plurality of logical fields comprising at least one logical field, generated from the logical field specification template, for composing an abstract query.

10. The method of claim 9, further comprising:
issuing the abstract query by the requesting entity according to the query specification;
transforming the abstract query into a query consistent with a particular physical data representation of the data; and
accessing a data repository comprising the physical entity of data.

11. The method of claim 10, where the query consistent with the particular physical data representation is one of a SQL query, an XML query and a procedural request.

12. The method of claim 10, wherein transforming the abstract query into the query consistent with the particular physical data representation comprises partitioning the abstract query into sub-queries grouped according to access method types.

13. The method of claim 12, wherein the access method types are selected from a group comprising an SQL query type, an XML query type and a procedural request type.

14. A computer-implemented method of generating a logical field specification for a logical field associated with a physical entity of data in a computer system, the physical entity of data having a particular physical data representation, the method comprising:
providing a logical field specification template comprising a plurality of specification sub-fields, each specification sub-field designated by a sub-field descriptor and at least one specification sub-field representing a dynamic value sub-field designated by a dynamic value sub-field descriptor, the logical field specification template further comprising a query;
accessing the respective physical entities of data to determine a plurality of data items associated with the dynamic value sub-field descriptor, wherein accessing comprises executing the query;
linking the dynamic value sub-field to the determined plurality of data items; and
generating, based on the corresponding determined data items linked to the specification sub-fields, logical field specifications, each logical field specification specifying a logical field name, at least one location attribute identifying a location of physical data, and a reference to an access method selected from at least three different access method types, wherein each of the different access method types defines a different manner of exposing the physical data to a user, wherein at least one of the generated logical field specifications contains a reference to a first access method type which exposes the respective physical data in its native physical form, and at least one of the generated logical field specifications contains a reference to a second access method type which requires the respective physical data to be input to an expression, the result of wich expression is exposed to the user; wherein values for at least the logical field names and location attributes are provided by the corresponding determined data items.

15. The method of claim 14, wherein the linking of each specification sub-field to a corresponding determined data item comprises replacing the sub-field descriptor designating a corresponding specification sub-field with the determined data item.

16. The method of claim 14, further comprising:
combining a plurality of logical fields in at least one data repository abstraction adapted for use by a software application for accessing the physical entity of data.

17. The method of claim 14, wherein the accessing comprises querying the physical entity of data using a Structured Query Language (SQL) query.

18. The method of claim 14, wherein the plurality of sub-field descriptors comprises at least one of a category name indicating the category of the logical field, the logical field name designating the logical field, the access method, a logical field identifier uniquely identifying the logical field and a logical field description describing the content of the logical field.

19. The method of claim 18, wherein the access method specifies a location for accessing the physical entity of data.

20. The method of claim 14, wherein the accessing comprises determining a structure of the physical entity of data.

21. The method of claim 20, wherein the determining of a structure comprises launching one of a C, a C++ and a JAVA parsing procedure.

22. A computer-readable medium containing a program which, when executed on a computer system, performs an operation of generating a logical field specification for a logical field associated with a physical entity of data in a computer system, the physical entity of data having a particular physical data representation, the operation comprising:
providing a logical field specification template comprising a plurality of specification sub-fields, each specification sub-field designated by a sub-field descriptor;
accessing the respective physical entities of data to determine data items associated with the sub-field descriptors of each specification sub-field;
linking each specification sub-field to a corresponding determined data item; and
generating, based on the corresponding determined data items linked to the specification sub-fields, logical field specifications, each logical field specification specifying a logical field name, at least one location attribute identifying a location of physical data, and a reference to an access method selected from at least three different access method types, wherein each of the different access method types defines a different manner of exposing the physical data to a user, wherein at least one of the generated logical field specifications contains a referennce to a first access method type which exposes the respective physical in its native physical form, and at least one of the generated logical field specifications contains a reference to a second access method type which requires the respective physical data to be input to an expression, the result of which expression is exposed to the user; wherein values for at least the logical field names and location attributes are provided by the corresponding determined data item.

23. The computer-readable medium of claim 22, wherein the linking of each specification sub-field to a corresponding determined data item comprises replacing the sub-field descriptor designating a corresponding specification sub-field with the determined data item.

24. The computer-readable medium of claim 22, wherein the plurality of specification sub-fields comprises at least one dynamic value sub-field designated by a dynamic value sub-field descriptor, the operation further comprising:

accessing the physical entity of data to determine a plurality of data items associated with the dynamic value sub-field descriptor;

linking the at least one dynamic value sub-field to the determined plurality of data items.

25. The computer-readable medium of claim 22, the operation further comprising:

combining a plurality of logical fields in at least one data repository abstraction adapted for use by a software application for accessing the physical entity of data.

26. The computer-readable medium of claim 22, wherein the accessing comprises querying the physical entity of data using a Structured Query Language (SQL) query.

27. The computer-readable medium of claim 22, wherein the plurality of sub-field descriptors comprises at least one of a category name indicating the category of the logical field, the logical field name designating the logical field, the access method, a logical field identifier uniquely identifying the logical field and a logical field description describing the content of the logical field.

28. The computer-readable medium of claim 22, wherein the accessing comprises determining a structure of the physical entity of data.

29. The computer-readable medium of claim 28, wherein the determining of a structure comprises launching one of a C, a C++ and a JAVA parsing procedure.

30. A computer-readable medium containing a program which, when executed on a computer system, performs an operation of providing access to a physical entity of data in a computer system, the physical entity of data having a particular physical data representation, the operation comprising:

providing a logical field specification template comprising a plurality of specification sub-fields, each specification sub-field designated by a sub-field descriptor; the logical field specification template further comprising a query;

accessing the respective physical entities of data to determine data items associated with the sub-field descriptors, wherein accessing comprises executing the query;

linking each specification sub-field to a corresponding determined data item to generate a respective logical field specification, wherein each logical field specification specifies a logical field name, at least one location attribute identifying a location of physical data, and a reference to an access method selected from at least three different access method types, wherein each of the different access method types defines a different manner of exposing the physical data to a user, wherein at least one of the generated logical field specifications contains a reference to a first access method type which exposes the respective physical data in its native physical form, and at least one of the generated logical field specifications contains a reference to a second access method type which requires the respective physical data to be input to an expression, the result of which expression is exposed to the user; wherein values for at least the logical field names and location attributes are provided by the corresponding determined data items; and providing, for a requesting entity, a query specification comprising a plurality of logical fields comprising at least one generated logical field for defining an abstract query.

31. The computer-readable medium of claim 30, the operation further comprising:

issuing the abstract query by the requesting entity according to the query specification;

transforming the abstract query into a query consistent with a particular physical data representation of the data; and accessing a data repository comprising the physical entity of data.

32. The computer-readable medium of claim 30, where the query consistent with the particular physical data representation is one of a SQL query, an XML query and a procedural request.

33. The computer-readable medium of claim 30, wherein transforming the abstract query into the query consistent with the particular physical data representation comprises partitioning the abstract query into sub-queries grouped according to access method types.

34. The computer-readable medium of claim 33, wherein the access method types are selected from a group comprising an SQL query type, an XML query type and a procedural request type.

35. A computer-readable medium containing a program which, when executed on a computer system, performs an operation of generating a logical field specification for a logical field associated with a physical entity of data in a computer system, the physical entity of data having a particular physical data representation, the operation comprising:

providing a logical field specification template comprising a plurality of specification sub-fields, each specification sub-field designated by a sub-field descriptor and at least one specification sub-field representing a dynamic value sub-field designated by a dynamic value sub-field descriptor; the logical field specification template further comprising a query;

accessing the physical entity of data to determine a plurality of data items associated with the dynamic value sub-field descriptor, wherein accessing comprises executing the query;

linking the dynamic value sub-field to the determined plurality of data items; and generating, based on the corresponding determined data items linked to the specification sub-fields, logical field specifications, each logical field specification specifying a logical field name, at least one location attribute identifying a location of physical data, and a reference to an access method selected from at least three different access method types, wherein each of the different access method types defines a different manner of exposing the physical data to a user, wherein at least one of the generated logical field specifications contains a reference to a first access method type which exposes the respective physical data in its native physical form, and at least one of the generated logical field specifications contains a reference to a second access method type which requires the respective physical data to be input to an expression, the result of which expression is exposed to the user; wherein values for at least the logical field names and location attributes are provided by the corresponding determined data items.

36. The computer-readable medium of claim 35, wherein the linking of each specification sub-field to a corresponding determined data item comprises replacing the sub-field descriptor designating a corresponding specification sub-field with the determined data item.

37. The computer-readable medium of claim 35, the operation further comprising:

combining a plurality of logical fields in at least one data repository abstraction adapted for use by a software application for accessing the physical entity of data.

38. The computer-readable medium of claim 35, wherein the accessing comprises querying the physical entity of data using a Structured Query Language (SQL) query.

39. The computer-readable medium of claim 35, wherein the plurality of sub-field descriptors comprises at least one of a category name indicating the category of the logical field, the logical field name designating the logical field, the access method, a logical field identifier uniquely identifying the logical field and a logical field description describing the content of the logical field.

40. The computer-readable medium of claim 35, wherein the accessing comprises determining a structure of the physical entity of data.

41. The computer-readable medium of claim 40, wherein the determining of a structure comprises launching one of a C, a C++ and a JAVA parsing procedure.

42. A computer-readable storage medium containing a data structure representing a logical field specification template for generating a plurality of logical field specifications associated with a physical entity of data in a computer system, the physical entity of data having a particular physical data representation, the logical field specification template comprising:

a plurality of specification sub-fields, each specification sub-field designated by a sub-field descriptor; wherein at least one specification sub-field is a dynamic value sub-field designated by a dynamic value sub-field descriptor for which a value is dynamically generated; and wherein each specification sub-field includes a query configured to access data to replace the respective sub-field descriptors with respective data values wherein the template is used to generate, by executing the respective queries, the plurality of logical field specifications, wherein each logical field specifies a logical field name, at least one location attribute identifying a location of physical data corresponding to the logical field name, and a reference to an access method selected from at least three different access method types, wherein each of the different access method types defines a different manner of exposing the physical data to a user;

wherein at least one of the generated logical field specifications contains a reference to a first access method type which is executed to form part of a physical query configured to retrieve physical data based on a respective location attribute identifying a location of the physical data, thereby exposing the physical data in its native physical form;

wherein the at least one of the generated logical field specifications contains a reference to a second access method type which is executed to form part of a physical query configured to retrieve physical data for each sub-field in the respective logical field specification and input the retrieved data into an expression, the result of which expression is exposed to the user; and wherein the at least one of the generated logical field specifications contains a reference to a third access method type which is executed to form part of a physical query configured to retrieve physical data based on the respective location attribute identifying a location of physical data and wherein the third access method type is configured to extend the part of the physical query with a selection filter that removes selected portions of the retrieved physical data.

43. The computer-readable storage medium of claim 42, wherein the dynamic sub-field descriptor is adapted to designate a range of values.

44. The computer-readable storage medium of claim 42, wherein the plurality of sub-field descriptors comprises at least one of a category name indicating the category of the logical field, the logical field name designating the logical field, the access method, a logical field identifier uniquely identifying the logical field and a logical field description describing the content of the logical field.

* * * * *